United States Patent
Sauseng et al.

(10) Patent No.: US 9,681,670 B2
(45) Date of Patent: Jun. 20, 2017

(54) PRECISION WEIGHING SYSTEM FOR MOVING PORTIONS OF DOUGH

(71) Applicant: KOENIG MASCHINEN GESELLSCHAFT M.B.H., Graz (AT)

(72) Inventors: Robert Sauseng, St. Radegund (AT); Johann Poellabauer, Wundschuh (AT)

(73) Assignee: KOENIG MASCHINEN GESELLSCHAFT M.B.H., Graz (AT)

( * ) Notice: Subject to any disclaimer, the term of this patent is extended or adjusted under 35 U.S.C. 154(b) by 242 days.

(21) Appl. No.: 14/425,130

(22) PCT Filed: Sep. 9, 2013

(86) PCT No.: PCT/AT2013/050179
§ 371 (c)(1),
(2) Date: Mar. 2, 2015

(87) PCT Pub. No.: WO2014/040106
PCT Pub. Date: Mar. 20, 2014

(65) Prior Publication Data
US 2015/0216184 A1    Aug. 6, 2015

(30) Foreign Application Priority Data
Sep. 13, 2012 (AT) .............................. A 50388/2012

(51) Int. Cl.
*A21C 5/00* (2006.01)
*A21C 5/04* (2006.01)

(52) U.S. Cl.
CPC ................ *A21C 5/003* (2013.01); *A21C 5/04* (2013.01)

(58) Field of Classification Search
CPC .................................. A21C 5/003; A21C 5/04
(Continued)

(56) References Cited

U.S. PATENT DOCUMENTS 1,871,261 A     8/1932   Eggert
2,270,512 A *   1/1942   Devlin ................... A21C 5/04
                                                        425/238
(Continued)

FOREIGN PATENT DOCUMENTS

AT        348457 B     2/1979
DE     3011863 A1    10/1981
EP     2174549 A1     4/2010

OTHER PUBLICATIONS

International Search Report mailed Jan. 15, 2014, from PCT Application No. PCT/AT2013/050179 (6 pages).

*Primary Examiner* — Joseph S Del Sole
*Assistant Examiner* — Thukhanh T Nguyen
(74) *Attorney, Agent, or Firm* — Kilpatrick Townsend & Stockton LLP

(57) ABSTRACT

This invention relates to a precision weighing system for transporting or moving portions of dough with a dividing slider (2) in a device for portioning and processing dough, wherein the system has a rotatably mounted, in particular pivotally mounted, first pivoting lever (11), and a rotatably mounted, in particular pivotally mounted, second pivoting lever (12), wherein the second pivoting lever (12) carries an actuating projection (18) for the reciprocating motion of the dividing slider (2), and the first pivoting lever (11) can be pivoted about the pivot bearing thereof by a drive, wherein an air bellows (4) is disposed between the first pivoting lever (11) and the second pivoting lever (12), the volume and/or shape of said air bellows being variable by compressed air admission, and which specifies the distance between the opposing lever arms of the two pivoting levers (11, 12).

27 Claims, 4 Drawing Sheets

Figure 1:
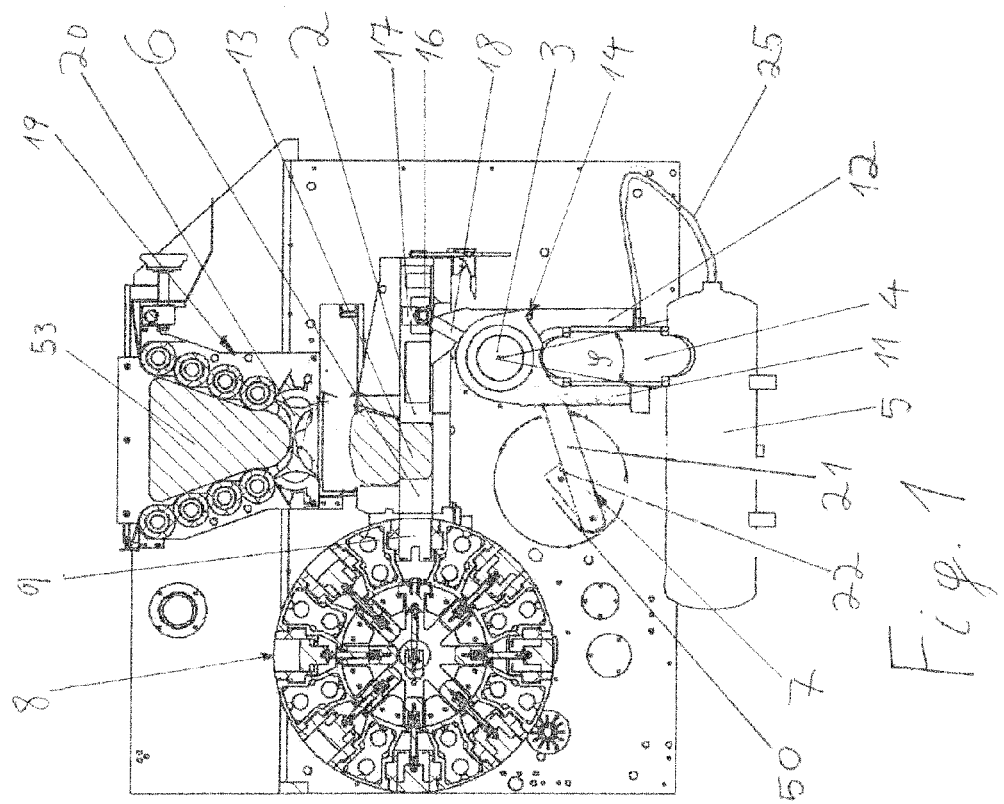

(58) Field of Classification Search
USPC .......... 425/239, 238, 98, 260, 103; 426/503, 426/518
See application file for complete search history.

(56) References Cited

U.S. PATENT DOCUMENTS 3,485,187 A * 12/1969 Benier ..................... A21C 5/02
                                                425/238
6,986,655 B2 * 1/2006 Khekht ................... A21C 5/00
                                                425/239

* cited by examiner

PRECISION WEIGHING SYSTEM FOR MOVING PORTIONS OF DOUGH

This application is a U.S. National Phase of International Application No. PCT/AT2013/050179, filed Sep. 9, 2013, which claims priority to Austrian Patent Application No. A 50388/2012, filed Sep. 13, 2012, the disclosures of which are incorporated by reference herein.

This invention relates to a precision weighing system for transporting or moving portions of dough with a dividing slider in a device for portioning and processing dough according to the preamble of patent claim 1.

From prior art, dividing sliders are known which are moved linearly by means of toggle mechanisms with springs. The dividing slider directly driven by a drive via a toggle mechanism moves portions of dough towards a precision weighing drum. Herein, the springs of the toggle mechanism cause a constant injection force of the portions of dough into the precision weighing drum. If the dough, the portions of dough, or the amount of dough changes, the springs will change the injection force of the dividing slider based on the spring characteristic and the spring excursion. Thus, for different types of dough and portions of dough, it is not possible to ensure a constant injection force of the dough by the dividing slider into the precision weighing drum. Variation of the injection force results in a deviation of the amount of dough in the precision weighing drum from the specification, thereby altering the final weight of the baked goods.

Consequently, the object of the invention is to ensure constant injection force of the dividing slider into the precision weighing drum, regardless of the amount weighed and the nature of the dough. Another object is to create a precision weighing system of simple design and trouble-free operation. Said objects are solved by the invention with a precision weighing system of the type mentioned in the beginning having the features mentioned in the characterizing part of claim 1. According to the invention, provision is made for an air bellows to be disposed between the first pivoting lever and the second pivoting lever, the volume and/or shape of said air bellows being variable by compressed air admission, and which specifies the distance between the opposing lever arms of the two pivoting levers.

Empty runs can be avoided, and thereby, faster cycle times can be achieved if the first pivoting lever and the second pivoting lever can be applied against the air bellows or at least one pivoting lever is connected to the air bellows.

In order to ensure constant filling of the air bellows and identical weighing conditions of the portions of dough, it is advantageous for the air bellows to be connected to a compressed air source, preferably a pressure vessel or compressor.

For the pressure inside the air bellows to be maintained approximately constant and pressure surges inside the air bellows to be minimized by a buffer volume, provision is made for the air bellows to be connected to a compressed air source, preferably a pressure vessel designed as a buffer volume.

In order to have a better capacity for adapting the dividing slider to changes in the amount of dough and the composition of the dough, provision is made for the air bellows and/or the compressed air source to have a pressure regulating unit for setting the pressure inside the air bellows and consequently the volume and/or shape of the air bellows.

A compact and precisely operating embodiment of the invention provides for the first pivoting lever and the second pivoting lever to be pivotally mounted on pivot axes which are parallel to each other, or for the first pivoting lever and the second pivoting lever to be pivotally mounted with respect to each other on the same pivot axis.

One embodiment of the invention of a particularly simple design provides for a drive and a toggle to be provided for rotating the first pivoting lever, wherein the drive drives a short lever forming the toggle together with a long lever, wherein the end of the long lever is connected to the first pivoting lever.

Efficient load transmission from the first pivoting lever via the air bellows to the second pivoting lever is achieved if the air bellows is disposed at least partially in the path or plane of motion of the two pivoting levers.

In order to cause symmetrical load transmission from the first pivoting lever via the air bellows to the second pivoting lever and prevent tilting of the pivoting levers, provision is made for the first pivoting lever to have two bearing parts by which it is mounted on the pivot axis and between which the second pivoting lever is mounted on the pivot axis.

The invention achieves advantageous relative strength at the second pivoting lever if the length of the lever arm of the second pivoting lever in contact with the air bellows is greater than the length of the actuating projection, preferably from two to four times the length of the actuating projection.

A particularly suitable setting of the travel of the dividing slider is achieved if the filling pressure and filling volume of the air bellows define the opening angle between the first pivoting lever and the second pivoting lever.

In order to enable efficient setting of the dividing slider, provision is made for the opening angle between the pivoting levers to be adjustable and specified by the pressure inside the air bellows.

An advantageous embodiment of the invention is achieved if upon pivoting of the first pivoting lever via the toggle the air bellows can be admitted with compressed air, and the second pivoting lever can be deflected by the air bellows about the pivot axis so that the dividing slider coupled with the second pivoting lever can be moved along an output channel when the first pivoting lever is pivoted.

The operation of the inventive dividing slider is particularly efficient if the air bellows determines the opening angle between the pivoting levers and the rotation of the second pivoting lever and specifies the length of the excursion of the dividing slider and possibly the injection pressure of a portion of dough into a radial intake opening of a precision weighing drum.

Easy load transmission from the second pivoting lever to the dividing slider is achieved if the dividing slider has a recess which is engaged by the second pivoting lever, preferably with a roller rotatably mounted at the free end of the actuating projection.

In order to avoid unnecessary stretching of the air bellows and assist in returning the second pivoting lever, it is advantageous for a stop to be provided for limiting the opening angle and preventing overstretching of the air bellows, said stop having a catch and a stop face cooperating therewith, wherein possibly the stop face of the stop is made on the first pivoting lever and the catch is made on the second pivoting lever.

According to the invention, provision is made for the dividing slider to be incorporated into a device for portioning and processing dough.

One embodiment of the device provides for the device to have a drive for actuating the first pivoting lever, and/or for a precision weighing drum to follow the output path of the dividing slider or the output channel, and/or for a discharge channel of a pre-portioning device to open into the output channel.

A device working precisely under practical circumstances is created if a drive lever is hinged at a lever rotated by the drive, whereto the short lever of the toggle and a cantilever arm are pivotally hinged, wherein the cantilever arm drives the precision weighing drum.

Preferred embodiments of the invention will be explained hereafter with reference to FIG. 1 to FIG. 4.

Figure 2:
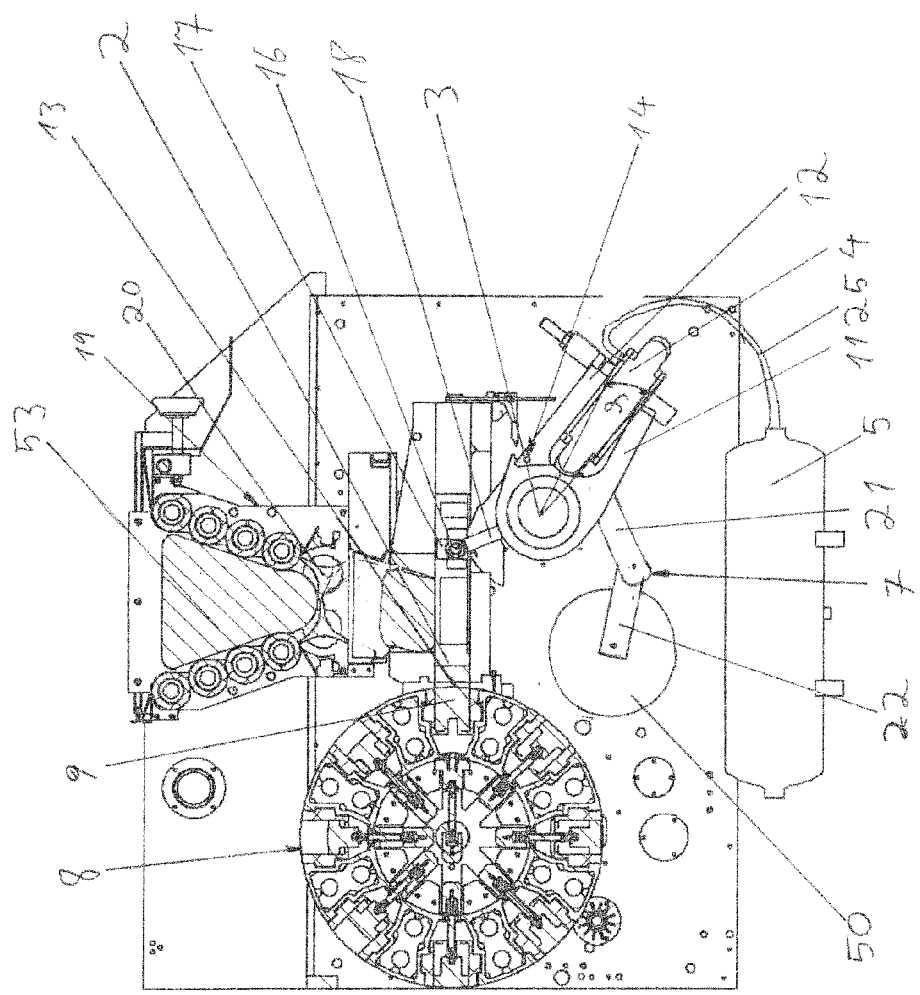
Figure 3:
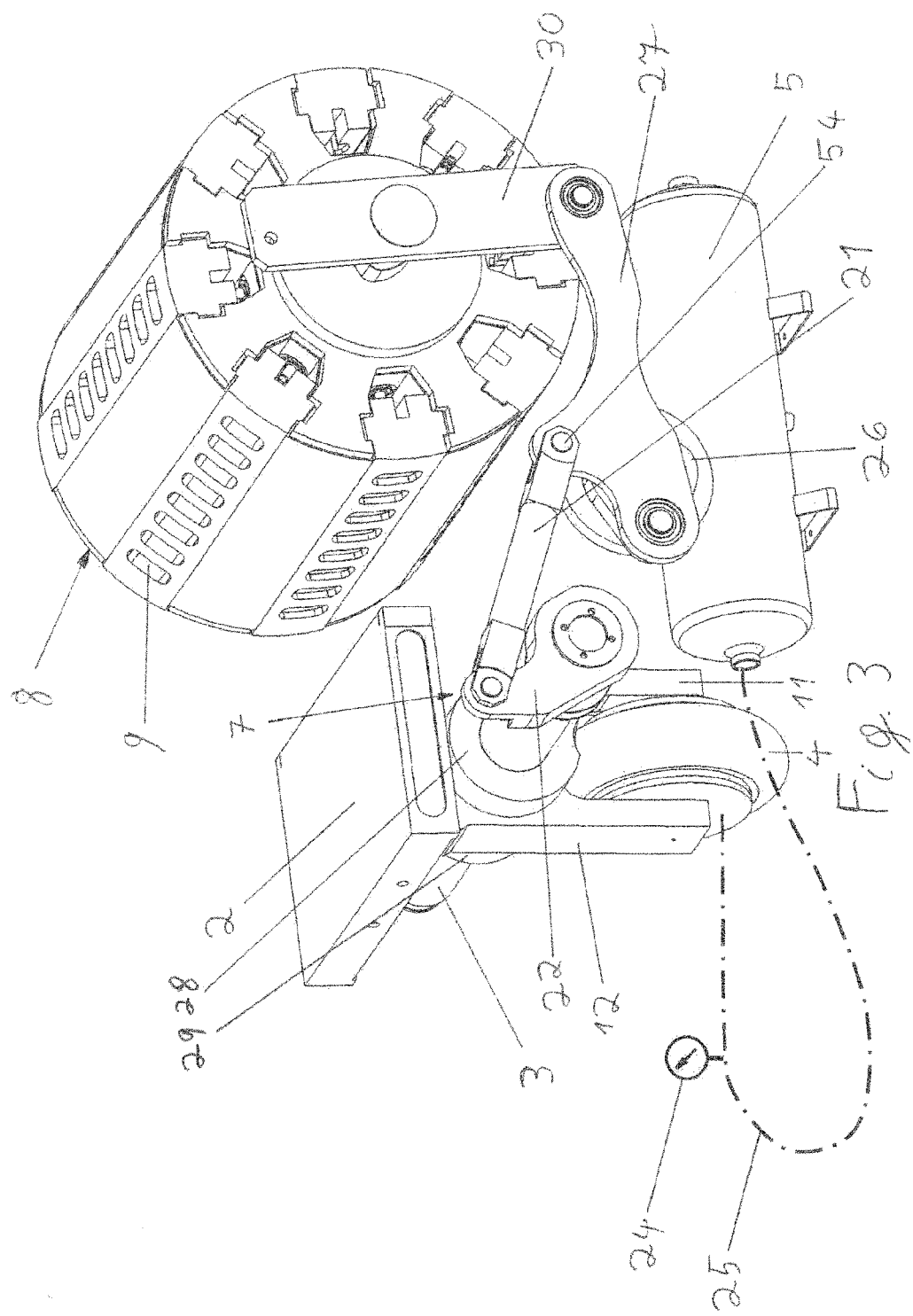
Figure 4:
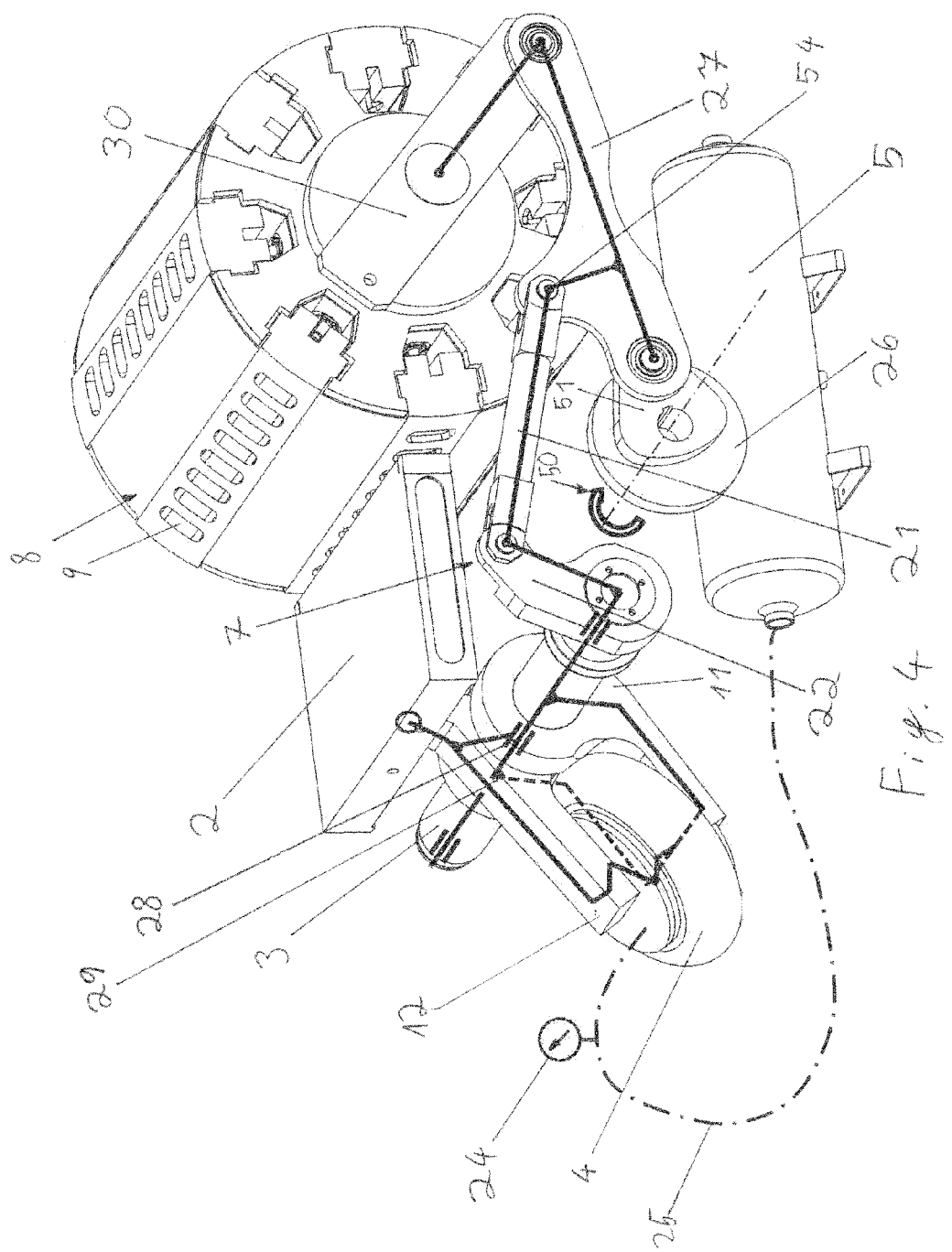

In the figures:

FIG. 1 schematically shows a precision weighing system with a dividing slider in the initial position, FIG. 2 schematically shows a precision weighing system with a dividing slider in the final position according to FIG. 1, FIG. 3 schematically shows a precision weighing system in a perspective view, and FIG. 4 schematically shows a precision weighing system in a perspective view according to FIG. 3.

FIG. 1 and FIG. 2 respectively show a schematic front view of an inventive precision weighing system for moving portions of dough 13 in a device for portioning and processing dough. Herein, the dough 53 is pre-portioned in a pre-portioning device 19 and discharged as a portion of dough 13 in an output channel 6 of a dividing slider 2 radially into an intake opening 9 of a precision weighing drum 8.

The precision weighing system comprises a first pivoting lever 11 and a second pivoting lever 12 rotatably mounted about a pivot axis 3. The two pivoting levers 11 and 12 are pivoted about the pivot axis 3 by a toggle 7 connected to a drive 50. The toggle 7 having a short lever 22 and a long lever 21 is extended by the drive 50 rotating the short lever 22. The long lever 21 is applied at the first pivoting lever 11, and upon extension of the toggle 7, causes the first pivoting lever 11 to pivot about the pivot axis 3.

Between the two pivoting levers 11, 12, an air bellows 4 is inserted as a pressure pad. Herein, the two pivoting levers 11, 12 are applied against opposing surfaces of the air bellows 4 and possibly connected to the air bellows 4. The application point of the first pivoting lever 11, the air bellows 4, and the second pivoting lever 12 are advantageously located in a plane extending vertically to the pivot axis 3. As represented, the first pivoting lever 11 may have bearing parts 28 and 29 located on either side of the second pivoting lever 12 or be of dual design. The second pivoting lever 12 is located between the bearing parts 28 and 29. This allows for symmetrical application of force, and no guiding against tilting is required.

In FIG. 4, the course of the second bearing part 29 of the first pivoting lever 11 is indicated in dashed lines. A stop 14 made as a catch on the second pivoting lever 12 and as a stop face on the first pivoting lever 11 limits the maximum opening angle φ of the first pivoting lever 11 and the second pivoting lever 12 with respect to each other and at the same time prevents overinflating and overstretching of the air bellows 4.

The air bellows 4 is connected to a pressure vessel 5 via a compressed air duct 25. The pressure vessel 5 acts as a buffer volume so that the pressure will not rise too much when the air bellows 4 is compressed. The objective is to apply an approximately constant force to the dividing slider 2. The distance of the first pivoting lever 11 from the second pivoting lever 12, and thus the opening angle φ, are determined by the filling pressure and filling volume of the air bellows 4 with the pressure vessel 5.

On the second pivoting lever 12, an actuating projection is formed extending the second pivoting lever 12 and causing load transmission from the second pivoting lever 12 to the dividing slider 2. The actuating projection 18 can be made as a rod and carry a roller 16 at the free end. When the dividing slider 2 is extended, the roller 16 is applied to the averted surface of a recess 17 of the dividing slider 2, and when the dividing slider 2 is returned, it is applied to a the surface facing the precision weighing drum 8.

When the second pivoting lever 12 is deflected about the pivot axis 3, the actuating projection 18 with the roller 16 thus causes translation of the dividing slider 2 inside the output channel 6 and causes the pivoting motion of the pivoting lever 11, 12 about the pivot axis 3 to be converted into translation of the dividing slider 2 inside the output channel 6. Thereby, the dividing slider 2 moves the portion of dough 13 towards the intake opening 9 of the precision weighing drum 8. The distance and the opening angle φ of the two pivoting levers 11, 12 specified by the air bellows 4 limit the excursion of the dividing slider 2 via motion coupling of the actuating projection 18.

The air bellows 4 is connected to a compressed air source 5, in this embodiment made as a pressure vessel with a compressor supplying the air bellows 4 with compressed air and acting as a buffer volume. A pressure regulating unit 24, advantageously integrated into the compressed air source 5 or pressure duct 25 adjustably specifies the filling volume and filling pressure of the air bellows 4, preferably as 1 to 3 bar, so that the filling pressure and filling volume of the air bellows 4 can be adjusted for different amounts of dough and different types of dough.

FIG. 2 shows a precision weighing system in a front view with the first pivoting lever 11 and the second pivoting lever in the deflected state. The dividing slider 2 is represented in the extended state. Deflection is caused by the toggle 7 which is driven by drive 50. The pressure and filling volume of the by now compressed air bellows 4 determine the opening angle φ of both pivoting levers 11, 12 and thus the adjusting force of the dividing slider 2. The portion of dough 13 represented was moved by the dividing slider 2 towards the intake opening 9 of the precision weighing drum 8, with the pressure set in the air bellows 4 specifying the injection force of the portion of dough 13 into the intake opening 9 of the precision weighing drum 8.

In FIG. 1 and FIG. 2, further essential parts of a device for portioning and processing dough are represented. A pre-portioning device 19 includes a star knife 20 for pre-portioning the dough 53. The pre-portioned dough then falls into the output channel 6 and is discharged by the dividing slider 2 as a portion of dough 13. Die precision weighing drum 8 includes a plurality of intake openings 9 and adjusting parts for receiving, processing, and conveying the portions of dough 13.

In the initial position according to FIG. 1, the air bellows 4 is uncompressed, and the first pivoting lever 11 is placed in the initial position by drive 50 via toggle 7. Stop 14 prevents opening beyond a maximum opening angle φ, and at the same time acts so as to carry along the second pivoting lever 12 into the initial position, and prevents overinflating of the pressurized air bellows 4. As the toggle 7 is stretched by the drive 50, the first pivoting lever 11 is deflected and transfers the pivoting motion in the form of pressure force to the second pivoting lever 12 via the air bellows 4. The pressurized air bellows 4 is compressed (FIG. 2), wherein the pressure vessel 5 acts as a buffer volume and prevents excessive pressure rise inside the air bellows 4. The air bellows 4 deflects the second pivoting lever 12 about the pivot axis 3, and due to motion coupling of the second pivoting lever 12 with the dividing slider 2, the deflection causes the dividing slider 2 to be extended towards the precision weighing drum 8.

As an alternative to the pressure vessel 5, the air bellows 4 can be connected to a compressed air duct 25 connected to a compressor, and the pressure regulating unit 24 can be disposed between the compressor and the air bellows 4.

As an alternative to the pivot axis 3, the first pivoting lever 11 may also be fastened to a shaft which is pivoted or rotated by the toggle 7 together with the first pivoting lever 11. Then, the second pivoting lever 12 is pivotally mounted on said shaft.

It is also possible for both pivoting levers 11, 12 to be mounted on adjacent parallel axes or shafts and for an air bellows 4 to be disposed therebetween.

FIG. 3 and FIG. 4 respectively show a perspective view of another embodiment of an inventive precision weighing system for moving portions of dough in a device for portioning and processing dough.

FIG. 3 shows a drive lever 27 fastened pivotally by drive 50, indicated by a circulating arrow in FIG. 4, via a drive level or flange 25 with an eccentric pivot, said drive lever being applied to a cantilever arm 30 of the precision weighing drum 8, on the one hand, and having an attachment off-center with a pivot bearing 54 for a short lever 22. Lever 22 connects the drive lever 27 to an eccentric projection or long lever 21 of a pivot axis made as a shaft 3, and is pivotally mounted on the drive lever 27 and the long lever 21. Levers 21 and 22 form the toggle 7.

The first pivoting lever 11 is rigidly fastened to the shaft 3 and is applied at the air bellows 4 and advantageously connected thereto. Opposite the first pivoting lever 11, the second pivoting lever 12 is applied at the air bellows 4, is advantageously also connected to the air bellows 4, and rotatably mounted on the shaft 3. As in the embodiment described in FIGS. 1 and 2, the second pivoting lever 12 is connected to the dividing slider 2 via an actuating projection 18 and a roller 16. The precision weighing drum 8 represented has several intake openings 9 located in parallel to each other, regularly along the circumference of the precision weighing drum 8. The air bellows 4 is connected to a pressure vessel 5 via the pressure duct 25.

FIG. 4 shows a perspective view of the inventive precision weighing system according to FIG. 3 in the deflected state, wherein the dividing slider 2 is located in the forward extended position. Furthermore, FIG. 4 shows the coupling of forces and the flow of forces of drive 50, merely hinted, to the precision weighing system and precision weighing drum 8.

When the flange 26 is rotated about the rotating axis thereof, the cantilever or drive arm 30, and thus the precision weighing drum 8, is rotated about the rotating axis thereof via the drive lever 27. The drive lever 27 thus pivoted, then carries along the actuating lever or short lever pivotally connected via the off-center attachment 54. Following the eccentric projection or long lever 21, the lever 22 is rotated, thereby rotating shaft 3 about the rotational axis thereof. The first pivoting lever 11 fastened to the shaft 3 is deflected and pressurized by the air bellows 4 connected thereto. Due to the internal pressure and filling volume of the air bellows 4, the movement is transferred to the second pivoting lever 12, advantageously connected thereto, and the second pivoting lever 12 is deflected about the rotational axis of the shaft 3. Thereby, dividing slider 2 is extended into the forward position and pushes the portions of dough 13 into the intake openings 9 of the precision weighing drum 8 with an injection force determined by the air bellows 4.

The invention claimed is:

1. A precision weighing system for transporting or moving portions of dough, comprising a dividing slider (2) in a device for portioning and processing dough, wherein the system has a rotatably mounted first pivoting lever (11), and a rotatably mounted second pivoting lever (12), wherein the second pivoting lever (12) carries an actuating projection (18) for the reciprocating motion of the dividing slider (2), and the first pivoting lever (11) is pivotable about the pivot axis thereof by a drive, wherein between the first pivoting lever (11) and the second pivoting lever (12), an air bellows (4) is disposed the volume and/or shape of which is variable by compressed air admission, and which specifies the distance between the opposing lever arms of the two pivoting levers (11, 12).

2. The precision weighing system according to claim 1, wherein the first pivoting lever (11) and the second pivoting lever (12) can be applied against the air bellows (4), or at least one pivoting lever (11, 12) is connected to the air bellows (4).

3. The precision weighing system according to claim 1, wherein the air bellows (4) is connected to a compressed air source (5).

4. The precision weighing system according to claim 1, wherein the air bellows (4) is connected to a compressed air source (5).

5. The precision weighing system according to claim 1, wherein the air bellows (4) and/or the compressed air source (5) has/have a pressure regulating unit (24) for adjusting pressure inside the air bellows (4) and consequently the volume and/or shape of the air bellows (4).

6. The precision weighing system according to claim 1, wherein the first pivoting lever (11) and the second pivoting lever (12) are pivotally mounted on pivot axes (3) parallel to each other, or that the first pivoting lever (11) and the second pivoting lever (12) are mounted on the same pivot axis (3) pivotally with respect to each other.

7. The precision weighing system according to claim 1, wherein for rotating of the first pivoting lever (11) a drive (50) and a toggle (7) are provided, wherein the drive (50) drives a short lever (22), forming the toggle (7) together with a long lever (21), with the end of the long lever (21) being connected to the first pivoting lever (11).

8. The precision weighing system according to claim 1, wherein the air bellows (4) is disposed at least partially in the path or plane of motion of both pivoting levers (11, 12).

9. The precision weighing system according to claim 1, wherein the first pivoting lever (11) has two bearing parts (28, 29), by which it is mounted on the pivot axis (3) and between which the second pivoting lever (12) is mounted on the pivot axis (3).

10. The precision weighing system according to claim 1, wherein the length of the lever arm of the second pivoting lever (12) in contact with the air bellows (4) is greater than the length of the actuating projection (18).

11. The precision weighing system according to claim 1, wherein the filling pressure and filling volume of the air bellows (4) define the opening angle ($\phi$) between the first pivoting lever (11) and the second pivoting lever (12).

12. The precision weighing system according to claim 1, wherein an opening angle ($\phi$) between the pivoting levers (11, 12) is adjustable and specified by the pressure inside the air bellows (4).

13. The precision weighing system according to claim 1, wherein when the first pivoting lever (11) is pivoted by the toggle (7), the air bellows (4) can be pressurized, and the second pivoting lever (12) can be deflected about the pivot axis (3) by the air bellows (4) so that the dividing slider (2) coupled to the second pivoting lever (12) can be moved along an output channel (6) when the first pivoting lever (11) is pivoted.

14. The precision weighing system according to claim 1, wherein the air bellows (4) determines the opening angle ($\phi$) between the pivoting levers (11, 12), and the rotation of the second pivoting lever (12), and specifies the length of the excursion of the dividing slider (2), and the injection pressure of a portion of dough (13) into a radial intake opening (9) of a precision weighing drum (8).

15. The precision weighing system according to claim 1, wherein the dividing slider (2) has a recess (17) which is engaged by the second pivoting lever (12).

16. The precision weighing system according to claim 1, wherein a stop (14) for limiting the opening angle ($\phi$) and preventing overstretching of the air bellows (4) is provided having a catch and a stop face cooperating therewith, with the stop face of the stop (14) possibly being formed on the first pivoting lever (11) and the catch on the second pivoting lever (12).

17. A device for portioning and processing dough, comprising a precision weighing system according to claim 1.

18. The device according to claim 17, wherein the device has a drive (50) for actuating the first pivoting lever (11).

19. The device according to claim 17, wherein the initial path of the dividing slider (2) or the output channel (6) is followed by a precision weighing drum (8).

20. The device according to claim 17, wherein a discharge channel of a pre-portioning device (19) opens into the output channel (6).

21. The device according to claim 17, wherein on a lever (51) rotated by drive (50), a drive lever (27) is hinged at which the short lever (22) of the toggle (7) and a cantilever arm (30) are hinged pivotally, with the cantilever arm (30) driving the precision weighing drum (8).

22. The precision weighing system according to claim 1, wherein the rotatably mounted first pivoting lever (11) is pivotally mounted, and wherein the rotatably mountedsecond pivoting lever (12) is pivotally mounted.

23. The precision weighing system according to claim 3, wherein the compressed air source (5) comprises a pressure vessel.

24. The precision weighing system according to claim 3, wherein the compressed air source (5) comprises a compressor.

25. The precision weighing system according to claim 4, wherein the compressed air source (5) comprises a pressure vessel configured as a buffer volume.

26. The precision weighing system according to claim 10, wherein the length of the lever arm of the second pivoting lever (12) in contact with the air bellows (4) is from two to four times the length of the actuating projection (18).

27. The precision weighing system according to claim 15, wherein wherein the dividing slider (2) has a recess (17) which is engaged by the second pivoting lever (12) with a roller (16) rotatably mounted at the free end of the actuating projection (18).

* * * * *